UNITED STATES PATENT OFFICE 2,453,687

CATION-EXCHANGE RESINS MADE BY CONDENSING A SULFOPHTHALEIN AND FORMALDEHYDE

Stanley P. Rowland, Philadelphia, Pa., assignor to Rohm & Haas Company, Philadelphia, Pa., a corporation of Delaware No Drawing. Application March 21, 1946, Serial No. 656,155

6 Claims. (Cl. 260—49)

This invention relates to resinous compositions which are insoluble in aqueous solutions of acids, bases, and salts, and which are particularly suitable for sorbing cations from fluids. More specifically, this invention concerns the preparation and use of cation-exchange resinous compositions comprising the insoluble, infusible reaction products of a sulfophthalein and formaldehyde.

The resinous compositions of this invention are prepared by reacting formaldehyde under controlled conditions with a sulfophthalein, in the form of a water-soluble salt, to form a resinous gel which is then heated and cured under controlled conditions to yield a dry, thermoset, hard, infusible and insoluble resin.

In the preferred process a sulfophthalein such as phenolsulfophthalein is first prepared by well-known methods. For example, phenol and sulfophthalic anhydride

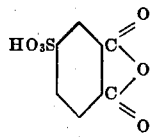

are heated and reacted. An acid catalyst, which is ordinarily used in the formation of phenolphthaleins, is not required in this case because of the acidic nature of the sulfophthalic anhydride itself. The sulfophthalein thus prepared is converted into a water-soluble salt, such as the salt of sodium, by neutralization of the phenolsulfophthalein with a base such as sodium hydroxide. The water-soluble salt in aqueous solution is then heated and condensed with formaldehyde, preferably at refluxing temperature. It is believed that the molecules of the phthalein are thereby joined into larger molecules or polymers by means of methylene bridges. The course of the condensation can be followed by viscosity determinations. Ultimately, the reaction mixture is converted into a gel. This can and will take place in the reaction vessel; but it is more convenient to transfer the reaction mixture to shallow trays prior to gel formation and then let the formation of the gel take place in the tray. When a gel is formed, the entire reaction mixture has the appearance of a uniform jelly-like mass. This gel is then dried and heated until the resin is cured. Due to the formation of the gel, the product is porous and thus has an extremely large area for contact with fluids. The product is obtained as a dry, hard, friable, porous or sponge-like mass of cured, insoluble, infusible resin which is preferably then broken into particles having the required size for use in treating fluids. If desired, the resin may be converted into the hydrogen form by washing with an aqueous solution of a strong, mineral acid. During this washing with acid, the cation of the resin is liberated and is replaced by hydrogen. Such an exchange of ions is common in water-treating resins and carbonaceous zeolites and in this case the resin is recognized as being converted from the sodium form to the hydrogen, or acid, form.

In the preparation of the phthalein, it is preferred to use phenol itself due to its availability and reactivity. Metacresol, 3,5-dimethylphenol, and resorcinol may also be used although somewhat less advantageously. All of these phenols have a sufficient number of reactive positions open or available for reactivity with sulfophthalic anhydride and later with formaldehyde to yield a thermoset product.

Modifications of the method described for preparing the phthalein are well-known.

The condensation of the formaldehyde and the sulfophthalein in the form of a water-soluble salt is carried out in solution in order to obtain a gel which is later dried to a sponge-like resinous mass. Because the physical properties of the final insoluble and infusible product are quite as important as the chemical composition, it is important that the condensation product go through the gel stage prior to being cured. Otherwise, the proper physical properties are not attained. Condensation is carried out under the influence of heat; and refluxing temperatures are especially suitable. The amount of formaldehyde which is employed should be from about 2.0 to about 4.0 mols per mol of sulfophthalein. In most instances an upper limit of 3.0 mols is preferred.

The drying and curing of the resinous gel is conducted preferably at temperatures from about 75° C. to about 140° C. Higher temperatures may be used but always with the attendant danger of partially decomposing the resins. At temperatures below 75° C. the drying period is unnecessarily long and the resin may not be completely cured. Obviously, a reduction of pressure accelerates drying.

The following example illustrates a process for making the products of this invention:

Into a three-necked flask, equipped with thermometer, mechanical stirrer, and reflux condenser, was placed one mol of sulfophthalic anhydride,

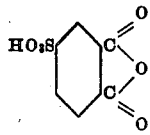

and two mols of phenol. The mixture was stirred and heated to 150° C. and maintained at 150° C. for four hours.

The reaction mixture was cooled to 80° C. and neutralized with a 10% aqueous solution of sodium hydroxide. The sodium salt of phenolsulfophthalein thus prepared was soluble. To the solution of the phenolsulfophthalein salt was added three mols of formaldehyde in the form of a 37% Formalin solution. The resultant solution was heated at 85°–90° C. for four hours after which the contents of the flask was transferred to shallow trays and placed for four hours in an oven heated to 100° C. During this time the entire mass gelled and most of the water was removed. Heating was continued at 150° C. for 15 hours during which time the resinous product was cured to an insoluble and infusible form. The product was a dark, hard, sponge-like mass which was easily broken into small particles. When crushed and screened to a mesh size of —20 to +40 and tested for cation-adsorbing properties in a one-inch, vertical, ion-exchange column, the resinous product was found to have a capacity of 3.91–4.20 milliequivalents of sodium carbonate per gram of resin.

The resins of this invention have high capacity; that is, they are capable of sorbing large amounts of cations per unit of weight. This high capacity is due to the chemical composition of the resins and also to their porous structure which results from their having passed through the gel stage while being made. After becoming saturated with cations they may be regenerated to the sodium form or hydrogen form by contact, respectively, with an excess of sodium ions or an acid wash. This ability to be used repeatedly for cation-adsorption and repeatedly regenerated is an important advantage. The resins may also be used in conjunction with inert materials and may be prepared in the presence of carriers, extenders, or fillers such as silica, alumina, starch, wood flour, etc.

I claim:

1. An insoluble, infusible, porous, resinous composition having cation-exchange properties, which comprises a cured condensate of (1) a sulfophthalein, which is the product of condensing sulfophthalic anhydride having the formula

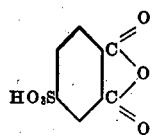

and a phenol from the group consisting of phenol, m-cresol, 3,5-dimethylphenol, and resorcinol, and (2) formaldehyde, the latter being condensed in the ratio of 2 to 4 mols per mol of said phthalein.

2. An insoluble, infusible, porous, resinous composition having cation-exchange properties, which comprises a cured condensate of (1) phenolsulfophthalein, which is the product of condensing phenol and sulfophthalic anhydride having the formula

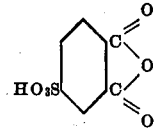

and (2) formaldehyde, the latter being condensed in the ratio of 2 to 4 mols per mol of said phthalein.

3. An insoluble, infusible, porous, resinous composition having cation-exchange properties, which comprises a cured condensate of (1) phenolsulfophthalein, which is the product of condensing phenol and sulfophthalic anhydride having the formula

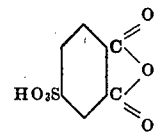

and (2) formaldehyde, the latter being condensed in the ratio of 2 to 3 mols per mol of said phthalein.

4. A process for preparing insoluble, resinous compositions suitable for the sorption of cations from fluids, which comprises reacting by condensing in aqueous solution under the influence of heat (1) a water-soluble salt of a sulfophthalein, which is the product of condensing sulfophthalic anhydride having the formula

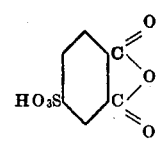

and a phenol from the class consisting of phenol, m-cresol, 3,5-dimethylphenol, and resorcinol, and (2) formaldehyde, said formaldehyde being condensed in the ratio of 2 to 4 mols per mol of said sulfophthalein salt, continuing said condensation until a gel is formed, drying and heating said gel until it is converted into a porous mass of insoluble, infusible resin.

5. A process for preparing insoluble, resinous compositions suitable for the sorption of cations from fluids, which comprises reacting by condensing in aqueous solution under the influence of heat (1) a water-soluble salt of phenolsulfophthalein, which is the product of condensing phenol and sulfophthalic anhydride having the formula

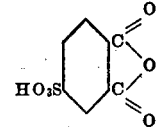

and (2) formaldehyde, said formaldehyde being condensed in the ratio of 2 to 4 mols per mol of said sulfophthalein salt, continuing said condensation until a gel is formed, drying and heating said gel until it is converted into a porous mass of insoluble, infusible resin.

6. A process for preparing insoluble, resinous compositions suitable for the sorption of cations from fluids, which comprises reacting by condensing in aqueous solution under the influence of heat (1) the sodium salt of phenolsulfophthalein, which is the product of condensing phenol and sulfophthalic anhydride having the formula

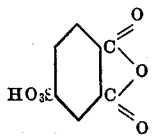

and (2) formaldehyde, said formaldehyde being condensed in the ratio of 2 to 4 mols per mol of said phthalein salt, continuing said condensation until a gel is formed, drying and heating said gel until it is converted into a porous mass of insoluble, infusible resin.

STANLEY P. ROWLAND.

REFERENCES CITED

The following references are of record in the file of this patent:

UNITED STATES PATENTS

| Number | Name | Date |
|---|---|---|
| 2,027,337 | Heck | Jan. 7, 1936 |
| 2,191,853 | Holmes | Feb. 27, 1940 |
| 2,319,359 | Wassenegger | May 18, 1943 |
| 2,333,754 | Wassenegger | Nov. 9, 1943 |